April 25, 1950  J. R. MILLER  2,505,335
SELF-RELEASING TOOLHOLDER
Filed July 29, 1944
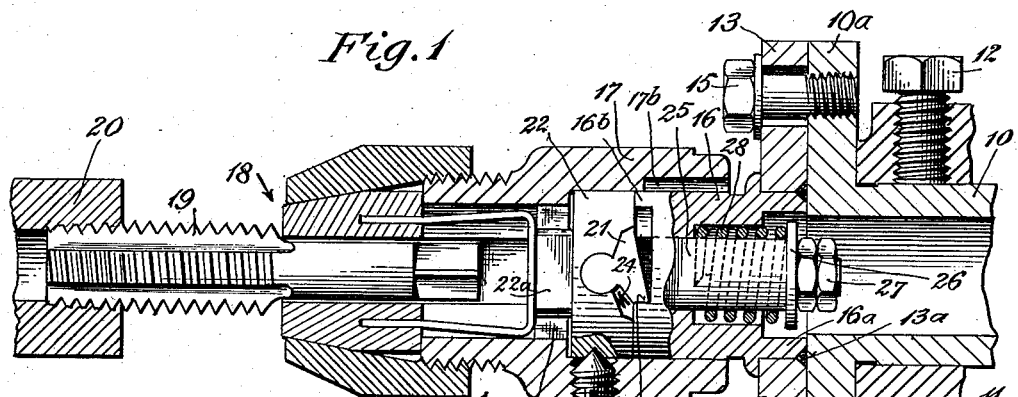
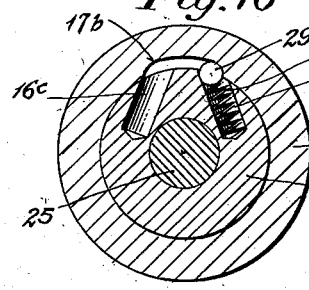
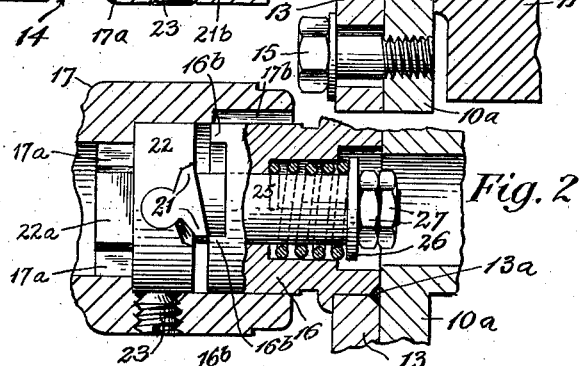
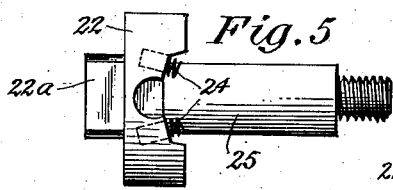
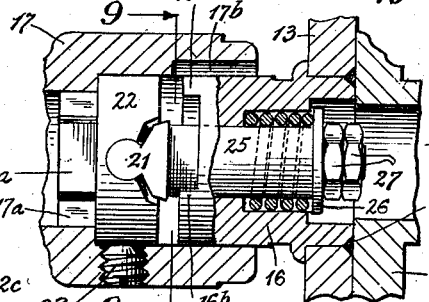
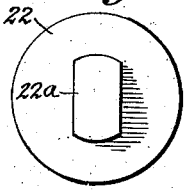
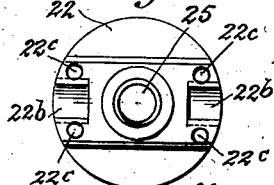
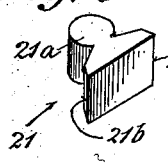
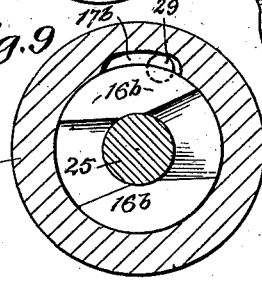
INVENTOR
John Roland Miller,
BY
Johnson + Kline
ATTORNEYS Patented Apr. 25, 1950

2,505,335

UNITED STATES PATENT OFFICE 2,505,335

SELF-RELEASING TOOLHOLDER

John Roland Miller, Bridgeport, Conn., assignor to George H. Cote, Bridgeport, Conn.

Application July 29, 1944, Serial No. 547,217

4 Claims. (Cl. 10—129)

This invention relates to holders for thread cutting tools, for use with automatic screw machines, turret lathes and the like, and more particularly to such holders of the releasing type.

These releasing holders, used with workpieces which are being rotated in a machine, generally operate on the principle of separating two sets of cooperable clutch teeth in the holder at the completion of a threading cut, so that the tool-carrier part of the holder may rotate with the work and thus discontinue the threading, whereupon the machine spindle is reversed and the tool carrier locked against turning, as by a ratchet, to cause the tool to unthread from the work.

A disadvantage of holders of this type is that considerable wear of the clutch teeth may be occasioned when the tool carrier is being rotated with the work, because of the teeth striking against each other.

An object of the present invention is to obviate this disadvantage by the provision of a novel clutch assembly having driving pawls or levers equipped with clutch teeth and so mounted that when the teeth are initially separated from the cooperating teeth of the holder the pawls are automatically moved to further separate the teeth. Thus the likelihood of the latter striking each other and becoming quickly worn is eliminated. The pawls are so located that before the threading operation begins the teeth thereof only partially mesh with the cooperating teeth of the holder, the mounting for the pawls being arranged to cause a more complete meshing of the teeth as the threading operation gets under way.

This mounting comprises pivoting parts which operate in a manner to minimize axial components of stresses on the tool carrier part of the holder caused by the further meshing of the clutch teeth. As a result, the accuracy of the threading operation is not impaired, as might be the case if axial pressure were exerted by the clutch parts on the tool carrier sufficiently to advance it relatively to the mounting for the holder, which would mean an advance faster than the timed advance of the machine turret carrying the mounting.

In the embodiment of the invention illustrated, each pawl or lever has oppositely located clutch surfaces so that either a right-hand or left-hand drive may be effected, for cutting either right-hand or left-hand threads without manually repositioning the pawls.

The novel pawl-operated clutch mechanism of this invention is extremely simple and compact, and its use does not require an increase in the usual size of releasing tool holders. If, after extended use, the clutch surfaces of the pawls should wear, the pawls may be removed and new ones quickly and conveniently inserted.

Other features and advantages will hereinafter appear.

In the accompanying drawings—

Figure 1 is an axial sectional view of a releasing tool holder embodying the invention, the pawl being shown in the relative position assumed at the beginning of the threading operation.

Fig. 2 is a fragmentary axial section showing the parts at the completion of the threading operation, wherein the clutch surfaces are at the point of separation.

Fig. 3 is a view similar to Fig. 2, but showing the pawl and clutch mechanism after separation of the teeth.

Fig. 4 is a similar fragmentary view showing the clutch parts in position for re-engagement, the tool carrier having returned to its starting position after release of the tap from the work.

Fig. 5 is a side elevation of the pawl carrier assembly.

Fig. 6 is a right end elevation of the carrier assembly of Fig. 5.

Fig. 7 is a left end elevation of the carrier assembly of Fig. 5.

Fig. 8 is a perspective view of one of the clutch pawls.

Fig. 9 is a transverse section taken on the line 9—9 of Fig. 3, and

Fig. 10 is a transverse section taken on the line 10—10 of Fig. 4.

Referring to Fig. 1, the releasing holder of the present invention comprises a shank 10 mounted in a turret 11 of a screw machine or the like and fastened therein by a set screw 12. The projecting end of the shank 10 has a two-eared flange 10a extending laterally therefrom and cooperating with a similarly shaped flange 13 for mounting a tool carrier and control mechanism 14 on the shank 10. The flanges 10a and 13 have aligned apertures for receiving cap screws 15 by means of which the flanges are secured together, and preferably the apertures in the flange 13 are larger than the shanks of the screws so that a limited adjustable positioning of one flange on the other is possible.

The tool carrier and control mechanism 14 has a boss or body 16 on which is slidably and rotatably carried a shell 17 fixedly mounting a chuck 18 in which is clamped a tap 19 engaging a workpiece 20. The anchored end 16a of the body 16 extends through a central aperture in the flange 13 and is welded thereto as shown at 13a.

In releasing tool holders of this type, as illustrated, the operation of cutting a thread in the rotating workpiece 20 depends on a positive driving connection, as provided by clutch teeth, between the non-rotatable body 16 and the shell 17. As the threading operation progresses to the point of completion, the clutch teeth between the body 16 and shell 17 disengage to permit free rotation of the shell and tap 19 with the work.

According to the present invention a novel pawl-operated clutch mechanism is provided within the shell 17 for locking the latter to the body 16 during the thread cutting operation, and for releasing the shell at the proper moment in a manner that a substantial separation of the clutch surfaces occurs, so that during rotation of the tap and shell with the work, abrasion of the clutch teeth due to their striking each other is prevented.

Accordingly, the projecting end of the body 16 is provided with a pair of segmental clutch teeth 16b adapted to be engaged by pawls 21 mounted in a disk 22 which is rigidly fastened in the interior of the shell 17. For keying the shell and disk 22 together, the latter has a flatted extension 22a extending from one face into a broached recess 17a in the shell, the fastening for the disk comprising a plurality of set screws 23 threaded in the shell and spotted in the periphery of the disk.

The pawls 21 each have a cylindrical pivot portion 21a, Fig. 8, and oppositely located clutch surfaces 21b and 21c respectively, and are carried in diametrically-aligned oppositely located recesses 22b in the disk 22, Fig. 6, so as to extend toward the body 16. As shown, the recesses for the pawls 21 permit them to pivotally move between two limiting positions, the pawls being normally yieldably held in an intermediate position illustrated in Fig. 4 by coil springs 24 carried in suitable recesses 22c in the disk.

According to this construction, if a clockwise torque is applied to the shell 17 as by force transmitted from the rotating workpiece 20, the pawls 21 will be moved from their intermediate positions about their pivots to cause the clutch surfaces 21b thereof to more fully mesh with the teeth 16b of the body, as shown in Fig. 1. Or, if a counterclockwise torque is applied to the shell 17, the pawls will be pivoted so that the surfaces 21c thereof will engage opposite surfaces of the teeth 16b, in either case the shell being prevented from turning on the body 16 by these engagements.

During such application of force to the shell 17, the shell will be positioned on the body 16 by engagement of the end surfaces of the teeth 16b with the face of the disk 22.

For yieldably holding the shell 17 in this axial position on the body 16 the latter is centrally bored to slidably receive a stud 25, one end of which passes through and is welded to the disk 22. The stud 25 extends entirely through the body 16, carrying at its other end a washer 26 and lock nuts 27 by means of which a coil spring 28, located in a counterbore in the body 16, is positioned to enage the latter.

Fig. 1 illustrates the position of the various parts at the beginning of cutting a thread in the rotating workpiece 20. As the threading operation progresses the entire assemblage of chuck 18, shell 17, body 16 and turret 11 may advance with the tap 19 as the latter threads into the workpiece. At a point just prior to completion of the threading operation the turret 11 is halted and the remainder of the operation causes the shell 17 and chuck 18 to advance relative to the body 16. This causes a separation of the clutch teeth 21b of the pawls 21 and body 16 as shown in Figs. 2 and 3. Upon these teeth separating, the pawls will be immediately moved to their intermediate positions by the coil springs 24, as in Fig. 4, and in so doing the engaging surfaces of the pawls and teeth 16b of the body are separated a comparatively substantial distance so that there is eliminated the likelihood of their hitting each other during the ensuing rotation of the shell 17 and chuck 18 with the workpiece 20.

After separation of the clutch teeth and freeing of the shell 17, the machine operates to reverse the direction of turning of the workpiece 20, and it is desirable to now lock the shell to the body 16 so that the tap 19 will unthread itself from the workpiece 20, the shell being locked preferably in a rotative position wherein the clutch teeth of the pawl and body are aligned for meshing again.

For this purpose a single-position ratchet is provided, the bore of the shell 17 being formed with a groove 17b, and the body 16 with a pair of recesses 16c and 16d, Fig. 10, the latter carrying a ball 29 yieldably urged outwardly by a spring 30. This ratchet locks the shell against turning in one or the other selected direction, as determined by whether the ball 29 and spring 30 are in the recess 16c or the recess 16d. Thus, when the ball and spring are in the recess 16d, and reverse turning of the shell 17 is started, the ball will engage a wall of the groove 17b, and stop rotation of the shell in a position where the pawls 21 and clutch teeth 16b are aligned for meshing. The tap 19 now becomes unthreaded from the workpiece, and when the latter finally releases the tap, the spring 28 of the holder will return the shell 17 to the axial position of Fig. 4 in readiness for the next threading operation.

The pawls 21 are, in fact, small levers, and function as such, these levers having their fulcrum points at the pivot portions 21a, and as already mentioned, when the cutting of the workpiece 20 by the tool 19 commences, causing the levers to move about their fulcrums and further mesh the teeth 21b and 16b. The components of force between the said teeth in a direction axially of the shell 17 are small, due to the ease of turning of the levers, the location of the pivot portions 21a thereof, and due to the rolling action between the teeth occasioned by such location and by the pivotal movement of the levers. Since these axial components of the force are small, there is minimized the tendency for the shell 17 and chuck 18 to be pushed forward with respect to the body 16 and turret 11, and to therefore advance the tool 19 faster than the lead of the thread of the tool. As a result, the accuracy of the threading operation is not impaired.

Variations and modifications may be made within the scope of this invention and portions of the improvements may be used without others.

I claim:

1. A device of the type described having a centrally bored boss; a shell enclosing an end and side portions of the boss, rotatably and axially movable thereon; a member rigidly mounted in the shell adjacent the end of the boss; a stud fastened to the member, extending through the bore of the boss; a stop carried by the boss spring means engaging the extended end of the stud and the boss, said stop and spring means locating the shell on the boss in a predetermined position; a pawl carried by the member, pivotally movable between two positions, the boss and pawl having co-engageable partially-meshing separable clutch teeth for providing a driving connection between the shell and boss, and the mounting for the pawl causing it, when initially in one of said positions, to pivotally move to its other position when driving force is exerted on it, said other position being such that the clutch teeth become more fully meshed; and yieldable means for returning the pawl to its initial position whereby, when it is in its other position and the shell is axially moved from said predetermined position so as to cause initial separation of the clutch teeth, the pawl will be automatically returned to its initial position to further separate said teeth.

2. A device of the type described having a mounting body; a shell enclosing a portion of the body, rotatably and axially movable thereon; a member mounted rigidly in the shell adjacent the enclosed portion of the body; a stop carried by the body; spring means moving the member into engagement with the stop and locating the shell on the body in a predetermined position; a pawl having a projecting integral cylindrical pivot portion by which the pawl is pivotally carried in a recess in the member, said pawl being movable between two positions, and the body and pawl having co-engageable partially-meshing separable clutch teeth for providing a driving connection between the shell and body, the mounting for the pawl causing it, when initially in one of said positions, to pivotally move to its other position when driving force is exerted on it, said other position being such that the clutch teeth become more fully meshed; and yieldable means for returning the pawl to its initial position whereby, when it is in its other position and the shell is axially moved from said predetermined position so as to cause initial separation of the clutch teeth, the pawl will be automatically returned to its initial position to further separate said teeth.

3. A device of the type described having a centrally bored cylindrical mounting body; a shell enclosing an end and peripheral portion of the body, rotatably and axially movable thereon, said shell having chucking means for carrying a thread-cutting tool whereby turning movements may be imparted to the tool and shell by the rotation of a workpiece; a ratchet device between the body and shell preventing turning of the shell at a predetermined rotative position and only in one direction; a stud fastened to the shell, extending through the bore of the body; a stop on said body; spring means engaging the extended end of the stud and the body and yieldably holding the shell onto the body at a predetermined axial position; and a pawl pivotally carried in the shell, movable between two limits and yieldably held in a position intermediate said limits, the pawl and body having co-engageable clutch teeth partially meshing when the pawl is in said intermediate position, and the mounting for the pawl causing it to be moved to one of said limits to more fully mesh the clutch teeth and prevent turning of the shell when torque is applied to the latter, the said predetermined rotative position of the shell as controlled by the ratchet aligning the clutch teeth for meshing when the pawl is in said intermediate position whereby when the clutch teeth are more fully meshed and force is exerted on the shell for axially moving same against the said spring means to cause initial separation of the clutch teeth and freeing of the shell for turning, the pawl will be automatically returned to its intermediate position, further separating said teeth, and the shell upon removal of said force and after its rotation has been prevented by said ratchet, will be returned by said spring means to its predetermined axial position wherein the clutch teeth mesh.

4. A device of the type described having a mounting body and a tool carrier rotatably and axially movable with respect to the body, one of said parts having a member pivotally mounted thereon so that a portion of the member may be moved from a retracted to an extended position and vice versa, said portion and other part having co-engaging separable clutch surfaces whereby when the portion is in extended position and the carrier and body are in a predetermined relative axial position a positive rotary drive is effected between the latter two by the member, the mounting for which causes the said portion thereof to be maintained in extended position by the force of the drive, and permits the member to be pivoted in a direction separating said portion and clutch surface thereof from the clutch surface of the said other part after the carrier has first been moved axially from said predetermined position to initially disengage the clutch surfaces and relieve the driving pressure on said member; a stop carried by the body; spring means yieldably holding the carrier against the stop in said predetermined axial position; and a ratchet device between the body and shell preventing turning of the carrier at a predetermined rotative position and only in one direction, said predetermined rotative position being such that the separable clutch surfaces are aligned for meshing when the said portion of the member is in retracted position so that upon removal of the axial force from the carrier the latter will be returned by the said spring means to its predetermined driving position.

JOHN ROLAND MILLER.

REFERENCES CITED

The following references are of record in the file of this patent:

UNITED STATES PATENTS

| Number | Name | Date |
|---|---|---|
| 427,000 | Lewis | Apr. 28, 1890 |
| 547,386 | Stewart | Oct. 1, 1895 |
| 711,085 | Tyler | Oct. 14, 1902 |
| 770,057 | Foster | Sept. 13, 1904 |
| 852,057 | Foster | Apr. 30, 1907 |
| 915,144 | Witherell | Mar. 16, 1909 |
| 1,117,363 | Fisher | Nov. 17, 1914 |
| 1,173,573 | Hayden | Feb. 29, 1916 |
| 1,290,427 | Velk | Jan. 7, 1919 |
| 1,295,798 | Russell | Feb. 25, 1919 |
| 1,960,547 | Paulson | May 29, 1934 |
| 2,147,203 | Kylin | Feb. 14, 1939 |
| 2,206,047 | Poorman | July 2, 1940 |
| 2,333,868 | Kylin | Nov. 9, 1943 |